United States Patent [19]
Berg et al.

[11] Patent Number: 5,551,523
[45] Date of Patent: Sep. 3, 1996

[54] TRACTION LOCK

[75] Inventors: Gerald M. Berg, Lisbon; Larry E. Albright, Gwinner, both of N. Dak.

[73] Assignee: Clark Equipment Company, Woodcliff Lake, N.J.

[21] Appl. No.: 198,957

[22] Filed: Feb. 18, 1994

[51] Int. Cl.$^6$ ................................................. B60K 28/04
[52] U.S. Cl. ................................................. 180/273; 188/69
[58] Field of Search ................................. 180/273, 272; 188/171, 173, 69, 74

[56] References Cited

U.S. PATENT DOCUMENTS

| | | | |
|---|---|---|---|
| 772,754 | 10/1904 | Fraser . | |
| 2,317,344 | 4/1943 | Hood | 188/171 |
| 3,621,956 | 11/1971 | Suckow | 192/4 A |
| 3,704,757 | 12/1972 | Buress, III | 180/6.48 |
| 3,858,488 | 1/1975 | Newstead et al. | 92/61 |
| 3,978,946 | 9/1976 | Ream | 192/4 A |
| 4,057,297 | 11/1977 | Beck et al. | 303/71 |
| 4,091,889 | 5/1978 | Brown et al. | 180/101 |
| 4,276,998 | 7/1981 | Blackburn | 222/30 |
| 4,509,620 | 4/1985 | Verbos | 188/171 |
| 4,955,452 | 9/1990 | Simonz | 180/271 |
| 4,955,455 | 9/1990 | Albright et al. | 180/291 |
| 5,109,945 | 5/1992 | Koga | 180/273 |
| 5,154,491 | 10/1992 | Graham | 303/6.01 |
| 5,203,616 | 4/1993 | Johnson | 303/10 |
| 5,350,036 | 9/1994 | Shima | 180/273 |
| 5,365,804 | 11/1994 | Downs et al. | 188/31 |
| 5,425,431 | 6/1995 | Brandt et al. | 180/273 |

FOREIGN PATENT DOCUMENTS 428336  10/1912  France ................................. 180/273

*Primary Examiner*—Eric D. Culbreth
*Attorney, Agent, or Firm*—Westman, Champlin & Kelly, P.A.

[57] ABSTRACT

A traction lock for a vehicle, such as skid steer loader, which provides a lock member that engages rotary drive elements in to the final traction drive of the vehicle. The lock member is operated by signals that indicate a condition on the vehicle, such as the absence of an operator on an operator seat. The lock member is controlled by a solenoid which when energized will retract the lock member from a locking position and hold it retracted and when the solenoid is de-energized, the lock member moves to intercept a lug on a rotary drive element.

14 Claims, 5 Drawing Sheets

5,551,523

TRACTION LOCK

CROSS REFERENCE TO RELATED APPLICATIONS

Reference is made to the following related U.S. patent applications:

Related U.S. patent application Ser. No. 08/198,285, filed on Feb. 18, 1994 entitled OPERATOR PRESENCE SENSOR FOR OPERATOR'S SEAT.

Related U.S. patent application Ser. No. 08/198,847, filed on Feb. 18, 1994, entitled INTERLOCK CONTROL SYSTEM FOR POWER MACHINE.

BACKGROUND OF THE INVENTION

The present invention relates to a device for locking the traction drive of a vehicle, such as a skid steer loader.

The prior art includes devices for providing a traction lock, such as U.S. Pat. No. 4,955,452, which discloses a drive train lock which operates in response to movement of an operator restraint bar.

Other devices for engaging a brake to restrain the drive train in response to external condition signals have been advanced as well. U.S. Pat. No. 4,091,888 illustrates such a device for applying a brake to hold a vehicle from movement. An automatic braking mechanism which engages the teeth of a drive sprocket in a traction unit of a vehicle is shown in Pat. No. 3,704,757. U.S. Pat. No. 5,109,945 shows a device that is operable for braking a vehicle when a seat switch detects the absence of the operator.

SUMMARY OF THE INVENTION

The present invention is a mechanical lock for the traction drive of a vehicle such as a skid steer loader that is operable in response to some external signal, such as an operator presence seat switch, which indicates that the operator is absent, or a signal from an operator's seat bar that indicates the seat bar is raised.

In the preferred embodiment there is a positive wedge lock member that operates in conjunction with rotating discs carried by the input power shafts for the opposite sides of the drive train of a skid steer loader, which when provided with a signal, will drop into place and engage a lug on the rotating disk to provide a stop or lock for the traction drive. The wedge lock is suitably mounted for strength and operational characteristics that are desired and is urged to position to lock the drive train when, as disclosed, an operator's seat signal indicates that the operator has left the vehicle seat.

In the present invention, when used with skid steer loaders, an override control can be provided for releasing the lock even though the seat switch may be signalling the operator is not present in the seat so that when using accessories, such as a backhoe, where the operator will be seated on a separate seat, the skid steer loader can still be moved as needed for such operations. A further operator locking switch also can be used to lock the drive train when desired until the switch is manually released.

The present traction lock is a unit that is made to operate to lock the drive train if there is a signal and also if there is a power failure or problem in the circuitry that controls the traction lock.

DETAILED DESCRIPTION OF THE PREFERRED EMBODIMENTS

Reference is made to U.S. Pat. No. 4,955,455 to show a skid steer loader of the type used with the present traction lock, and also to show frame and drive train details.

Figure 1:
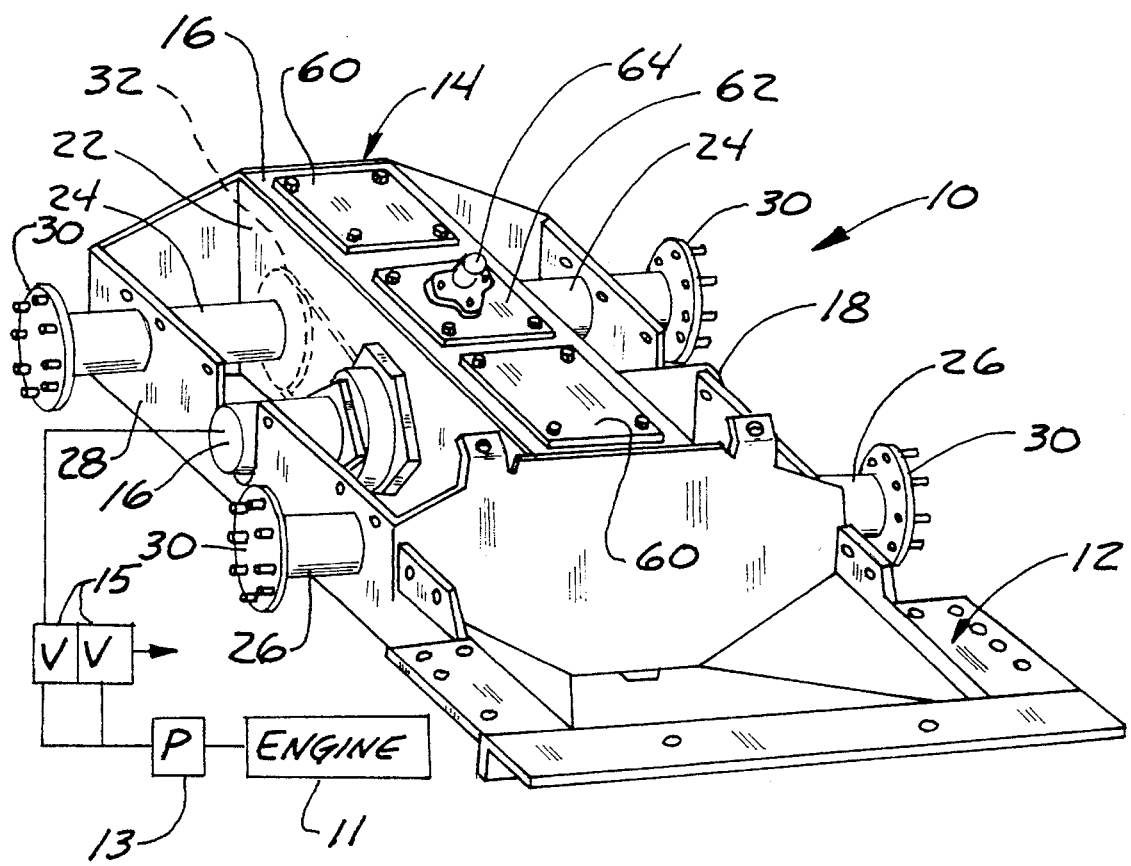
FIG. 1 is a rear perspective view of a main frame and drive train assembly with which the traction lock of the present invention is utilized.

FIG. 1 is a representation of a lower frame assembly 10 of a skid steer loader, for purposes of explanation. An internal combustion engine shown schematically at 11 is actually mounted on a support 12 at the rear of the main transmission case 14, and drives a hydraulic pump 13 to supply hydraulic power through control valves 15 to hydraulic motors shown at 16 and 18 mounted on the opposite side walls 22 of the transmission case in a known manner. The valves 15 control power to the motors that are used to propel the vehicle and are operated by levers in an operator's compartment as shown in U.S. Pat. No. 4,955,455. The side walls 22 also are used for mounting front axle housings 24 and rear axle housings 26 to the transmission case. Suitable frame supports 28 are used for supporting the outer end portions of the axle housings. The axle housings mount internal axle shafts in a known manner, which drive wheel hubs 30. On a skid steer loader drive, the axles are driven by chain and sprocket drives and the two wheels on each side of the skid steer loader are driven by one of the motors 16 and 18, respectively.

Figure 3:
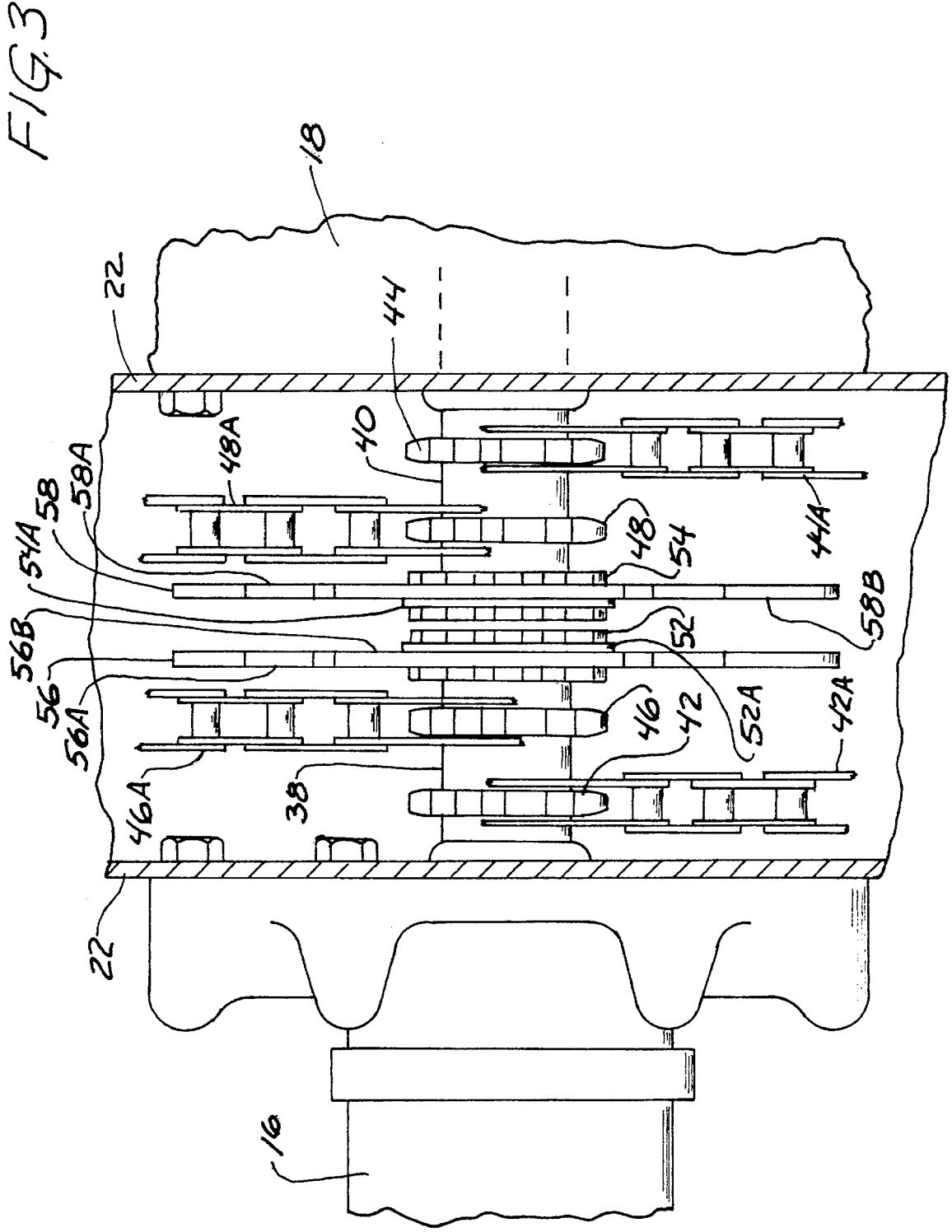
FIG. 3 is a top plan view of the drive train components utilized with the present invention.

In FIG. 1, a drive sprocket for the front left axle is indicated at 32 in dotted lines, and referring to FIG. 3, a cut away portion of the transmission is illustrated. The side walls 22, 22, as can be seen, mount hydraulic motors 16 and 18 respectively, and the motor shafts are drivably coupled to first and second sprocket assemblies 38 and 40 respectively. The sprocket assemblies 38 and 40 are identically constructed but are on opposite sides of the transmission case.

The conventional drive sprockets 42 and 44 on opposite sides of the transmission case are drivably connected by chains to sprockets on the rear axles to drive the rear wheel hubs 30, the sprockets 46 and 48 are used for driving, through chains 46A and 48A, sprockets on the respective front axles to drive the front wheel hubs 30. In the present invention, the sprocket assemblies 38 and 40 further include wide sprockets 52 and 54 respectively, on the respective sides, which each are formed as a unit with the respective drive sprocket assemblies 38 and 40. The sprockets 52 and 54 are elongated in axial direction and drivably support traction lock discs indicated at 56 and 58, respectively.

Each of the hydraulic motors can be individually operated in a forward or rearward direction, so that the wheels on one side of the transmission case can be driven independently of the wheels on the other side. In other words, the sprocket assemblies 38 and 40 are independent and are spaced apart at the center of the transmission case.

Referring to FIG. 1, it can be seen that the top wall of the transmission case 14 has three covers including front and rear covers 60, and a center cover 62. The center cover 62 is used for mounting a solenoid assembly 64, which is part of the traction lock of the present invention.

Figure 2:
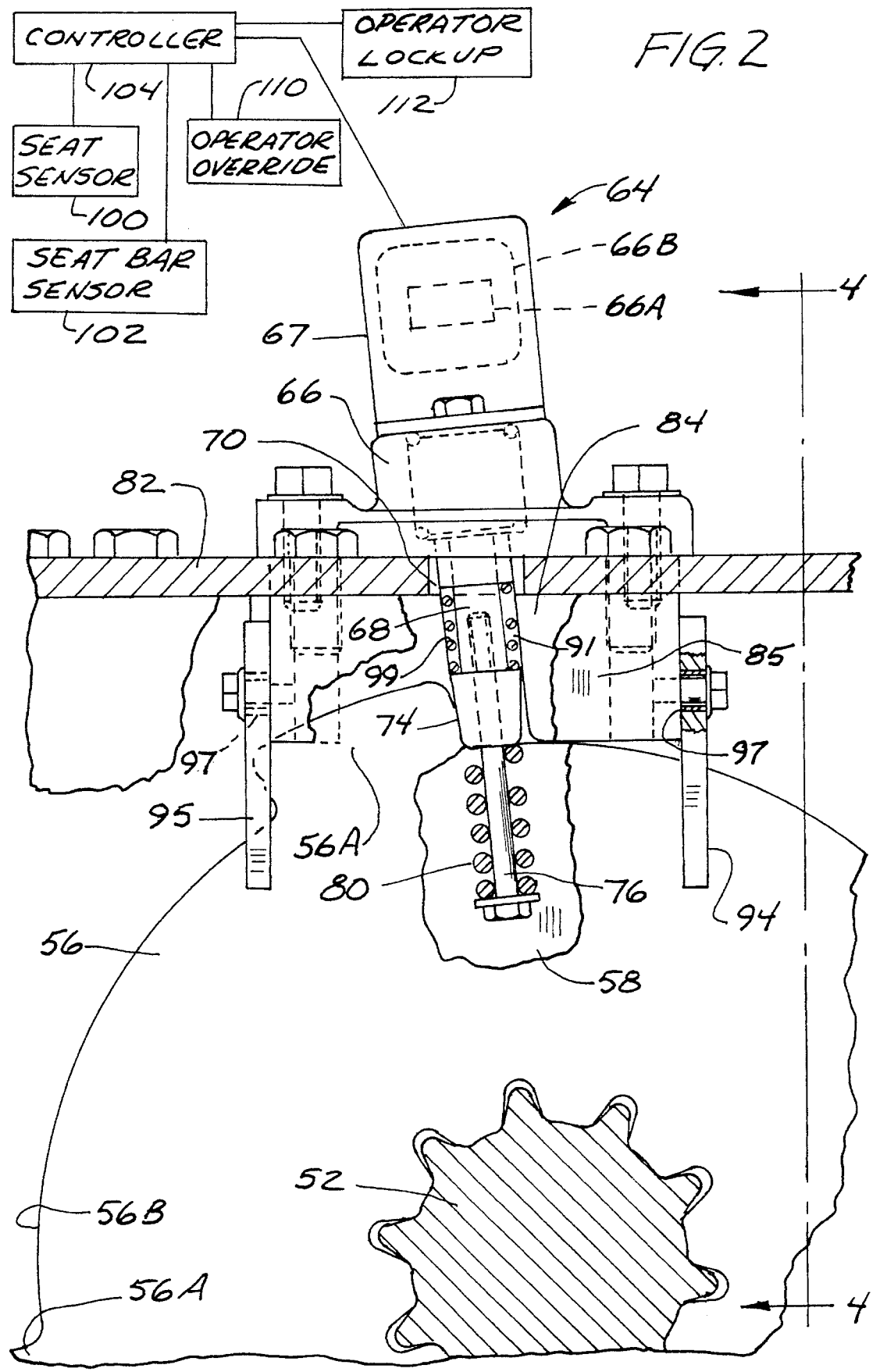
FIG. 2 is a fragmentary side sectional view taken from the right side of FIG. 2 showing a traction lock assembly in place.

A solenoid 67 is mounted on the cover 62 through an adapter casting as shown in FIG. 2. The adapter casting 66 supports the solenoid so that the central axis of the solenoid is inclined rearwardly slightly from the vertical.

Figure 4:
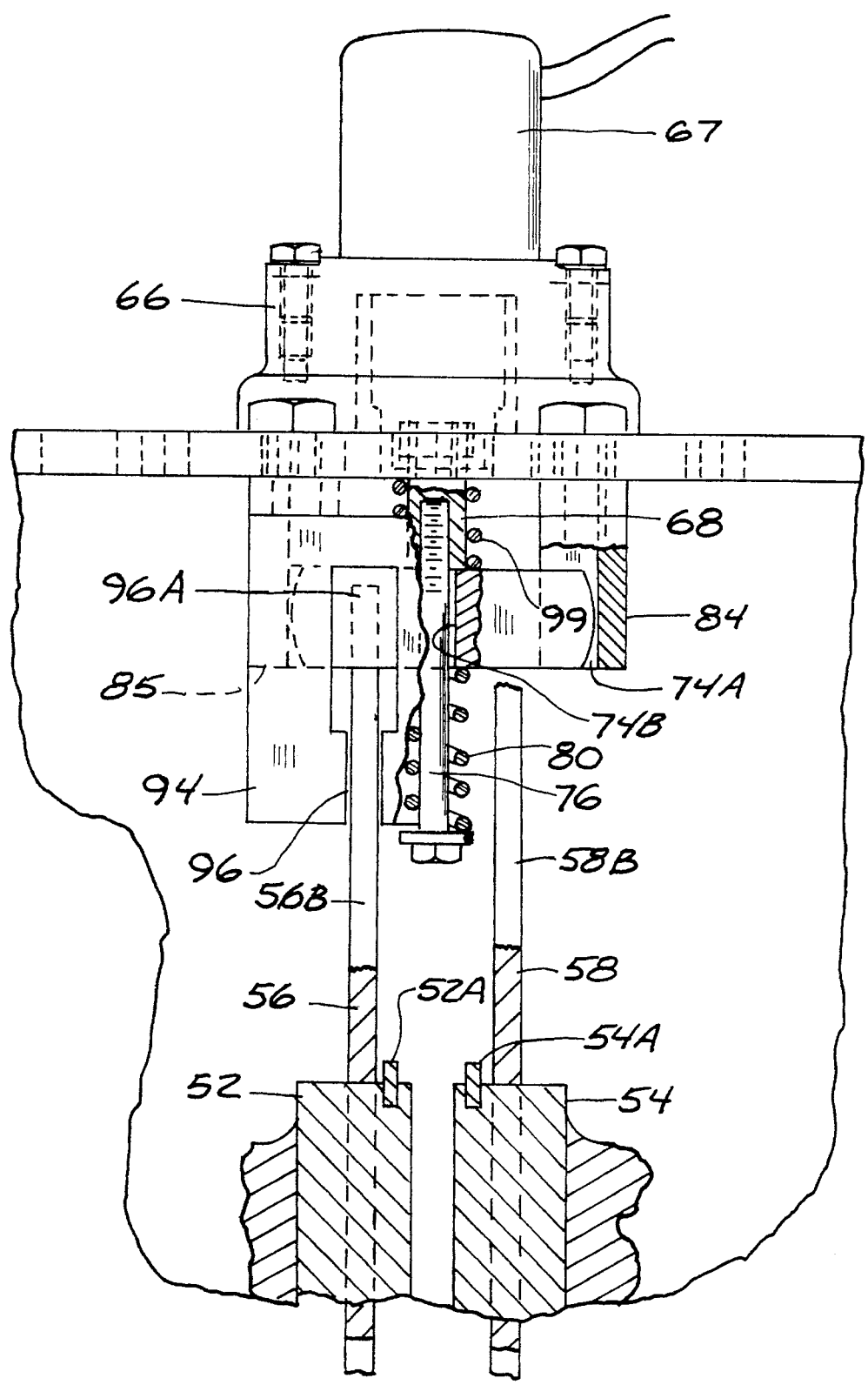
FIG. 4 is the front elevational view taken generally along the line 4—4 in FIG. 2.
Figure 6:
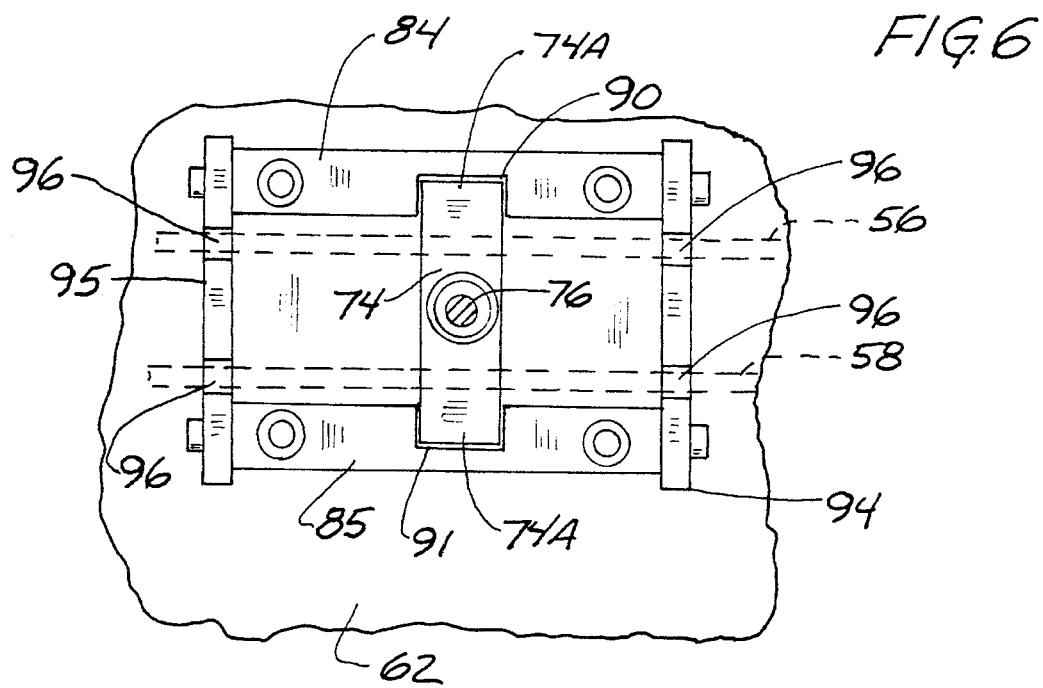
FIG. 6 is a bottom plan view of the device of FIG. 5.

As can be seen in FIGS. 2, 4, and 6, traction lock solenoid assembly 64 includes two actuator coils schematically shown at 66A and 66B inside of a housing. The pair of coils each exert a separate force on a solenoid plunger or actuator slug, for purposes that will be explained subsequently. Upon energization, force is exerted on the plunger or actuator slug indicated at 68 which extends through an opening 70 in the plate 62 as can be seen in FIG. 2.

The plunger 68 is used to support a locking wedge 74, which is the lock member wedge or panel of the traction lock system. The locking wedge 74 is mounted below the cover plate 62 and thus is within the transmission case just above the sprocket assemblies 38 and 40 and the discs 56 and 58, respectively. The discs 56 and 58 are drivably connected to the drive or power units comprising the hydraulic motors 16 and 18.

Figure 5:
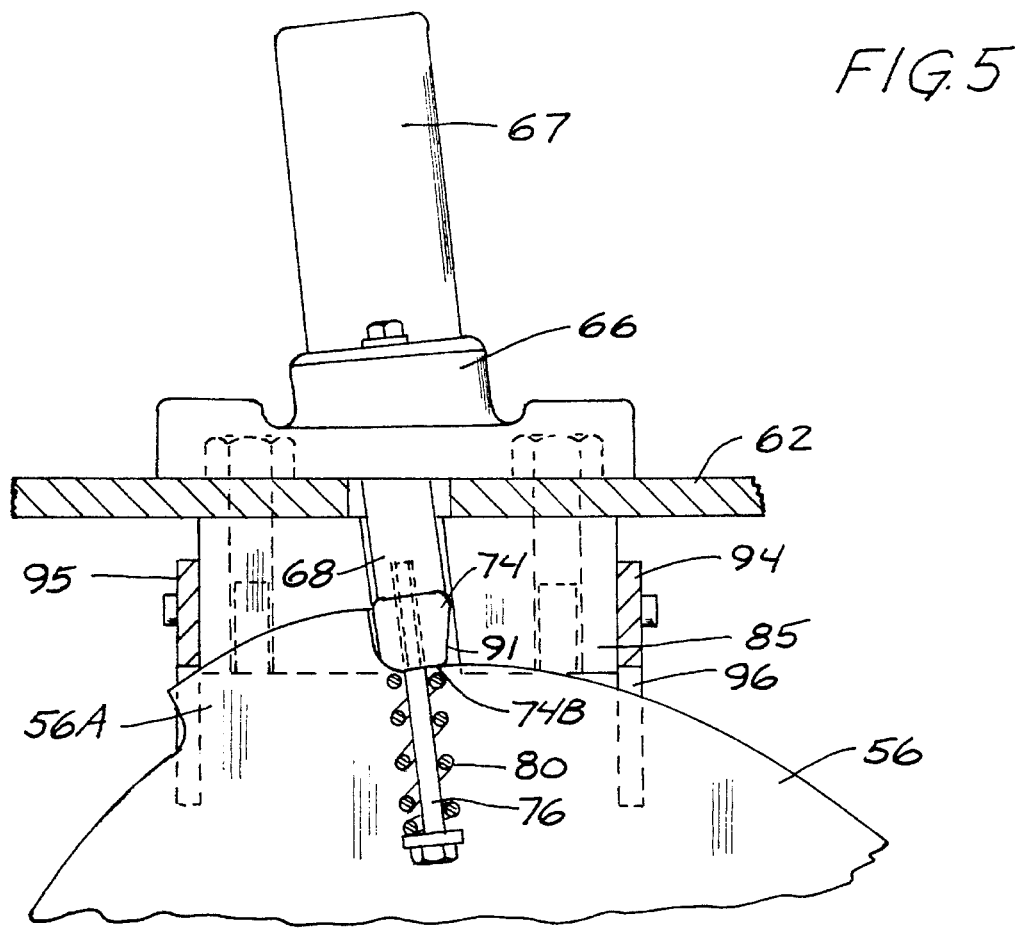
FIG. 5 is a simplified representation of the traction lock device of the present invention with parts in section and parts broken away.

The locking wedge 74 is held in place on the solenoid plunger using a bolt 76 that threads into the bottom of the plunger 68. Bolt 76 is a lock bolt that locks in place in the plunger 68. A spring 80 loads the wedge 74 against the bottom of the plunger 68. The bolt 76 is made so that it will threadably lock into the end of the plunger 68. The locking wedge 74, as can be seen in FIGS. 4 and 6, is elongated in transverse direction, and as shown in the end view of FIG. 4, the locking wedge 74 has rounded end portion 74A and as shown in FIG. 5 the locking wedge is tapered so that it has a generally trapezoidal cross section with the narrow edge 74B on the lower side.

The locking wedge is guided in a pair of guide blocks 84 and 85 which are securely fastened to the bottom side of the cover 62 through the use of cap screws threaded into bores in the blocks. The blocks 84 and 85 are spaced apart laterally, and are positioned on opposite sides of the two traction lock discs 56 and 58, respectively, as can be seen in FIG. 4.

Guide blocks 84 and 85 in turn have grooves 90 and 91 that are at the same angle as the axis of the solenoid relative to the vertical, which provide sliding ways for the rounded ends 74A of the locking wedge.

The guide blocks 84 and 85 are hardened to insure that there will be little wear, and that the wedge will slide easily in the guide blocks.

The bore or opening 74C for the bolt 76 that extends through the locking wedge is slightly larger than the bolt, also as shown in FIG. 4. This clearance permits the locking wedge to slide on the bolt 76. The fit is rather close so there is not a great deal of cocking of the wedge. The rounded ends 74A aid in assuring that there are not any edges or corners that will hang up, and the ends of the locking wedge are hardened to insure that there will be little wear and that the wedge will slide easily in the guide blocks.

Discs 56 and 58 as shown, each have a plurality of lugs that protrude up from the peripheral edge. In FIG. 2, disc 56 is illustrated and has lugs 56A (four as shown) which extend radially outward from the peripheral edge 56B of the rest of the disc.

The traction lock discs 56 and 58 are each driven from their respective sprockets 52 and 54. The bores of the locking discs have teeth that correspond to the sprockets 52 and 54. The traction locking discs are thus drivably mounted for rotation with the sprockets 52 and 54 respectively, and are held from moving off the ends of the sprockets by snap rings 52A and 54A respectively (See FIG. 4). The locking discs can float axially on their respective sprockets a short axial distance. The locking discs 56 and 58 are each guided by a pair of plastic plate guides 94 and 95 respectively. The guide plates 94 and 95 have steel bushings 97 passing through openings in the blocks and are bolted to the ends of the mounting blocks 84 and 85 through the bushings, which carry the compressive loads from bolt torque. The guide plates have grooves or slots formed therein as shown in FIG. 4 in particular which provide a guide opening 96 for each of the locking discs.

The guide openings 96 closely fit adjacent the sides of the locking discs, and there is an enlarged opening portion 96A that provides adequate clearance at the top of the locking discs in case the discs cock slightly. However, the plastic guide plates serve to guide the discs positively in a path so that the peripheral edges of the discs 56B and 58B respectively, are held for proper engagement of the lugs 56A or 58A with the locking wedge of 74 when the wedge is dropped into place.

It can be seen when the solenoid 67 is relaxed, the locking wedge will be permitted to drop down under a spring load from a spring 99 between the bottom of the cover 62 and the top of locking wedge 74 and as the respective discs rotate the locking wedge rides on the peripheral surface 56B or 58B until such time as one of the lugs 56A or 58A engage the locking wedge, at which time there would be a positive lock of the drive shafts and axles so that the vehicle could no longer move. The spring 99 provides a smaller biasing force than the spring 80.

In FIG. 2, it can be seen that the leading edge of lug 56A is substantially parallel to the tapered side edge of the locking wedge 74 when it engages the locking wedge (parts are broken away so this can be seen) and there will be a full surface engagement of the leading edge of one of the lugs 56A and 58A against the locking wedge to provide a bearing surface and a positive lock.

Thus, in operation, the traction lock can be engaged in response to various input signals, such as that from a seat sensor shown at 100 in FIG. 2, or a seat bar sensor shown at 102 in FIG. 2 which will be sent to a controller 104 for providing some logic control as to other conditions, if necessary, and if the vehicle operator is not present, the coils in the solenoid 67 will be de-energized permitting the wedge to drop under a spring load, toward the locking discs. The locking wedge will stop both of the discs 56 and 58 as the lugs on the discs contact the wedge, and thus stop the drive to the vehicle wheels.

The traction lock will work to provide the mechanical lock when the vehicle is under power or when it is coasting. The locking wedge supports can withstand power driven loads from the motor. The rotating final drive components on which the discs 56 and 58 operate do rotate at a moderate speed for example, in the range of 300–600 rpm.

It can be seen that the lugs 56A and 58A can provide a substantial load against the locking wedge and tend to hold it locked in place, so when the signals indicate that the vehicle can be again be driven, the controller will send a high current for pull to a large coil represented at 66A, for example about 40 amps, to provide a substantial pull on the locking wedge through the bolt 76 and the compression spring. The spring 80 can collapse fully so that the full load will be applied to the wedge tending to pull it upwardly, and as soon as the pressure is relieved either by the operator either intermittently operating the controls for the traction drive, or otherwise, the wedge will release and snap up out of the way of the disc lugs under this high pull force.

The controller, after a preselected time of about ½ second, or from other signals, will energize the holding coil indicated generally at 66B and de-energize the high power pull coil. The holding coil is a much lower power coil and takes much less current, so that the locking wedge will be held by the holding coil after it has been released from the lugs 56A and 58A.

In the system, an operator override switch or control indicated at 110 can be operated for example if the operator is to run a backhoe utilizing the hydraulic system and wishes to move a skid steer loader on which the traction lock is placed. The operator override switch is normally on the dash or control panel and is a push on-push off switch so that once on, the traction lock solenoid will remain energized to release the lock wedge and permit vehicle movement until the operator again pushes the switch. Thus, even if the seat sensor or the seat bar sensor indicates that the traction lock should be engaged, the traction lock will remain disengaged to accommodate the specific needs when the operator override switch is energized.

Usually the operator override switch would be located in a location such that the switch would be available to an operator that was in a desired location such as on a backhoe operator's seat. The operator override switch will not work is the seat sensor indicates an operator is present on the seat. The controller is programmed to establish the desired priority of functions.

An operator lock up control switch indicated schematically at 112 permits an operator to lock the traction drive through the controller and cause the traction drive to remain locked regardless of any other condition, except for the override switch 10, which will release the drive under all conditions. The switch 112 preferably is operated by an over center foot pedal, which once operated, will remain in the "on" position to keep the traction drive locked until the foot pedal is positively moved and released. Thus an operator has a switch which leaves the locking wedge in locking position until the operator again operates the operator lock up control switch, or operates the override switch 110.

The support casting for the solenoid and the guide bars can be piloted into holes in the cover, so that there is exact alignment to make sure that the locking wedge is properly aligned with the discs.

The locking actuator is sturdy, because shock loads can be involved when the wedge is dropped into place and the traction drive is locked. The locking wedge and lugs on discs 56 and 58 will operate with the vehicle going either forward or in reverse. The action is the same except the loads on the locking wedge are reversed in direction.

Although the present invention has been described with reference to preferred embodiments, workers skilled in the art will recognize that changes may be made in form and detail without departing from the spirit and scope of the invention.

What is claimed is:

1. A traction drive lock in combination with a powered vehicle, comprising:

a frame;

a rotary drive mounted on the frame for driving axles of the vehicle, said rotary drive including a rotating final drive component, said final drive component being rotatably mounted on the frame, a rotary element rotationally driven by said final drive component and having at least one lug which extends outwardly farther than adjacent portions of said rotary element; and a lock member movable in directions toward and away from the rotary final drive component along a guided substantially linear path between a first position wherein it clears the lug on the rotary element, and a second position where it intercepts the lug in the path of rotary movement of the lug;

a power actuator operable for holding the lock member in its first position and releasable to permit the lock member to move to its second position, said power actuator comprising a solenoid which has a plunger movable when the solenoid is energized;

and a spring to spring load the plunger relative to the lock member such that the plunger can move away from the lock member when the solenoid is energized regardless of loads on the lock member from the lug, and when the lock member is sufficiently unloaded, the spring being operable to move the lock member to its first position.

2. The traction drive lock of claim 1 and a controller for operating the solenoid, a sensor for sensing a condition and providing a signal to the controller for releasing the solenoid to permit the lock member to move to its second position.

3. The traction drive lock of claim 2 wherein said sensor comprises means to sense a condition of a vehicle seat to determine if it is not occupied and to permit the lock member to move to its second position when the seat is not occupied.

4. The traction drive lock of claim 2 wherein the signal is provided by sensing the position of an operator seat hair.

5. The traction drive lock of claim 3 and a separate manual override switch to energize the solenoid to release the lock member when the signal from the sensor indicates the seat is not occupied.

6. The traction drive lock of claim 1 wherein the rotary element is a disc having the lug formed on a periphery, the lug extending radially outwardly from other portions of the periphery of the disc.

7. The traction drive lock of claim 6 wherein the solenoid plunger operates along an axis, and wherein the axis is substantially radial relative to an axis of rotation of the disc, and is positioned at such an angle that a leading edge of the lug is substantially parallel to a side surface of the lock member in at least one rotary position of the lug, the lock member engaging the leading edge of the lug at such rotary position when the lock member is in its second position.

8. A traction lock for a powered vehicle, said vehicle having a frame and a rotary final drive shaft powered to provide traction drive to axles of the vehicle, comprising:

a disc mounted on said final drive shaft, said disc having a periphery with at least one lug protruding outwardly farther than adjacent portions of the periphery;

a locking wedge mounted on said frame and positioned radially outwardly from the disc, said locking wedge being movable between a first position wherein it clears the lug on the disc, and a second position wherein it intercepts the lug on the disc as the disc rotates said locking wedge having opposite ends extending outwardly on opposite sides of the disc;

a pair of guide blocks supported on the frame and each having a guideview formed therein, the guide blocks being positioned so the guideways receive the opposite ends of the locking wedge for guiding said locking wedge between its first and second positions;

a power actuator coupled to the locking wedge;

a spring member for urging the locking wedge toward its second position; and a controller for providing signals to release said power actuator to permit the spring member to move the locking wedge to its second position.

9. The traction lock of claim 8 wherein said power actuator comprises a solenoid, said solenoid being energizable at two power levels, a first power level providing a high pulling force for initially loading the locking wedge to move it to its first position, and a second lower power level which provides a lower holding force than the first power level.

10. The traction lock of claim 8 wherein the vehicle has a pair of rotary final drive shafts, a first of which mounts the first mentioned disc adjacent a first end thereof, said drive shafts being substantially coaxial and independently driven, and a second of the pair of shafts mounting a second disc adjacent a first end thereof, the shaft first ends being adjacent to each other so that the discs are substantially parallel and adjacent, each of the discs having at least one lug on the periphery thereof, and the said locking wedge having a width in direction along an axis of rotation of the shafts sufficient to span both of the discs, and simultaneously be engaged by lugs on both discs when the locking wedge is in its second position.

11. The traction lock of claim 9 wherein said locking wedge is mounted to said power actuator through a second spring being loadable to provide a greater force than the first mentioned spring for urging the locking member toward its second position, said second spring yielding for permitting said power actuator to move in a direction to urge the locking wedge to its first position under force generated by said second spring, whereby said second spring will be loaded and said locking wedge can remain in its second position after the power actuator has been operated in direction to move the locking wedge to its first position, and the locking wedge will remain in its second position until such time as the load on the locking wedge reduces to be lower than the loading from said second spring to permit the second spring to move the locking wedge to its first position.

12. A traction lock for a powered vehicle, said vehicle having a frame and a first and a second rotary final drive shaft powered to provide traction drive to axles of the vehicle, said first and second final drive shafts being substantially coaxial and independently driven, the final drive shafts having first ends adjacent each other, comprising:

first and second discs mounted on the first ends of the first and second final drive shafts, respectively, said discs each having a periphery with at least one lug protruding outwardly farther than adjacent portions of the periphery, the discs being substantially parallel and adjacent to each other;

a locking wedge mounted on said frame and positioned radially outwardly from the discs, and having a width in direction along an axis of rotation of the final drive shafts sufficient to span both of the discs, said locking wedge being movable between a first position wherein it clears the lugs on both of the discs, and a second position wherein it simultaneously intercepts the lugs on both of the discs as the discs rotate;

a power actuator coupled to the locking wedge to move the wedge to its first position;

a spring member for urging the locking wedge toward its second position; and controller means for providing signals to release said power actuator to permit the spring member to move the locking wedge to its second position.

13. A traction drive lock in combination with a skid steer loader having a frame and independent traction drives for first and second drive axles on opposite sides of the frame, comprising:

a rotary drive mounted on the frame for independently driving the drive axles of the skid steer loader, said rotary drive including a pair of rotating coaxial final drive members, said final drive members being rotatably mounted on the frame, a separate rotary element rotationally driven by each of said final drive members and each rotary element having at least one lug which extends outwardly farther than adjacent portions of the respective rotary element, the separate rotary elements being adjacent each other;

a lock member movable in directions toward and away from the rotary final drive members, the lock member having a width so it will engage the lugs on both of the rotary elements at the same time, the lock member being movable between a first position wherein it clears the lugs on both of the rotary elements, and a second position where it intercepts both of the lugs in the paths of rotary movement of the lugs; and a power actuator for holding the lock member in its first position.

14. A traction drive lock in combination with a powered vehicle, comprising:

a frame;

a rotary drive mounted on the frame for driving axles of the vehicle, said rotary drive including a rotating final drive component, said final drive component being rotatably mounted on the frame, a rotary element rotationally driven by said final drive component and having at least one lug which extends outwardly farther than adjacent portions of said rotary element; and a lock member movable in directions toward and away from the rotary final drive component along a guided substantially linear path between a first position wherein it clears the lug on the rotary element, and a second position where it intercepts the lug in the path of rotary movement of the lug;

a power actuator operable for holding the lock member in its first position and releasable to permit the lock member to move to its second position, said lock member having a width greater than a width of the rotary element; and guide blocks mounted on the frame in position to slidably guide opposite ends of said lock member and support the lock member from loads exerted by the rotary element.

\* \* \* \* \*

UNITED STATES PATENT AND TRADEMARK OFFICE
CERTIFICATE OF CORRECTION

PATENT NO. : 5,551,523
DATED : September 3, 1996
INVENTOR(S) : Berg et al.

It is certified that error appears in the above-indentified patent and that said Letters Patent is hereby corrected as shown below:

Column 6, line 38, please delete "hair" and insert --bar--.

Signed and Sealed this

Eleventh Day of February, 1997

Attest:

BRUCE LEHMAN

Attesting Officer        Commissioner of Patents and Trademarks